US008335727B2

(12) United States Patent
Neuwirt et al.

(10) Patent No.: US 8,335,727 B2
(45) Date of Patent: Dec. 18, 2012

(54) GROUP CONTENT ON DEMAND ACCESS CONTROL

(75) Inventors: Oleg Neuwirt, Heidelberg (DE); Daniele Abbadessa, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 400 days.

(21) Appl. No.: 12/622,011

(22) Filed: Nov. 19, 2009

(65) Prior Publication Data

US 2011/0119145 A1    May 19, 2011

(51) Int. Cl.
*G06Q 30/00* (2012.01)
(52) U.S. Cl. ............................. 705/26.2; 705/51; 705/52
(58) Field of Classification Search ................. 705/26.2, 705/51, 52
See application file for complete search history.

(56) References Cited

U.S. PATENT DOCUMENTS

| 6,269,343 | B1 * | 7/2001 | Pallakoff ...................... 705/26.2 |
| 6,604,089 | B1 * | 8/2003 | Van Horn et al. ............ 705/26.2 |
| 7,480,627 | B1 * | 1/2009 | Van Horn et al. ............ 705/26.2 |
| 2007/0283403 | A1 * | 12/2007 | Eklund et al. ................ 725/117 |
| 2008/0097825 | A1 * | 4/2008 | Leach et al. .................... 705/10 |
| 2008/0097826 | A1 * | 4/2008 | Leach et al. .................... 705/10 |
| 2008/0097827 | A1 * | 4/2008 | Leach et al. .................... 705/10 |
| 2008/0103878 | A1 * | 5/2008 | Leach et al. .................... 705/10 |
| 2009/0006184 | A1 * | 1/2009 | Leach et al. .................... 705/10 |
| 2010/0175084 | A1 * | 7/2010 | Ellis et al. ....................... 725/32 |
| 2012/0039578 | A1 * | 2/2012 | Issa et al. ....................... 386/205 |

OTHER PUBLICATIONS

Anon., "(DISHP) EchoStar to Offer New Personal Television Services for DISHPlayer—World's First Combination Internet/Satellite TV Receiver," Business Wire, Jul. 19, 1999.*
Anon., "Verizon FiOS TV Comes to Littleton, Natick, and Newton, Mass." PR Newswire, Dec. 21, 2006.*
Fortino, G., et al., "A Hierarchical Control Protocol for Group-Oriented Playbacks Supported by Content Distribution Networks" (Abstract), Journal of Network and Computer Applications, vol. 32, No. 1, pp. 135-157, Jan. 2009.*
Fortino, G., et al., "A Hierarchical Control Protocol for Group-Oriented Playbacks Supported by Content Distribution Networks," Journal of Network and Computer Applications, vol. 32, No. 1, pp. 135-157, Jan. 2009.*

* cited by examiner

*Primary Examiner* — Nicholas D Rosen
(74) *Attorney, Agent, or Firm* — Young & Thompson

(57) ABSTRACT

Digital content on demand (CoD) is provided under a group purchase option that permits separately located users to receive access on demand to a desired content with group-related benefits including discounted price discount or synchronized viewing.

36 Claims, 5 Drawing Sheets

```
v=0
o=- 1089335347 350207889 IN IP4 10.20.30.22
s=SyncView
u=http://cms.iptv.nlehd.de/GT2357399712aA3547        (700)
c=IN IP4 10.20.30.22
t=0 0
a=keywds:syncview, audio, video m=video 50000 RTP/AVP 34
a=rtpmap:34 H263/90000
a=fmtp:34 QCIF=1;SQCIF=1/MaxBR=1280
a=sendrecv m=audio 50002 RTP/AVP 0 8
a=rtpmap:0 PCMU/8000
a=rtpmap:8 PCMA/8000
a=sendrecv m=application 50004 RTP/I 0                          (701)
a=rtpmap:0 MPSYNC/16000
a=sendrecv
a=ptime:20
```

GROUP CONTENT ON DEMAND ACCESS CONTROL

BACKGROUND OF THE INVENTION

Current systems and methods for providing digital content on demand (CoD) implement a traditional model of users independently renting or buying access to a given content and then independently receiving and viewing the purchased content. In that traditional model, a service provider generates an individual content ticket corresponding to each user that has purchased a given piece of CoD. A content ticket typically comprises information that identifies the CoD, identifies the individual user, and optionally identifies the purchase price and validity period for which the ticket is effective. Each content ticket is specific to a given user and is generated and implemented independently of each other content ticket, even if a group of different users wish to purchase the same content.

Thus, for example, a group of separately located users wishing to view the same movie on demand can only purchase and view the movie independently of the other members of the group. It is not possible today for a group of separately located users to share the experience of purchasing and viewing a movie on demand together.

SUMMARY OF THE INVENTION

The present invention concerns new methods and mechanisms for providing CoD to a group of users. According to the invention, CoD is made deliverable to a plurality of users within a defined group such that each user within the group is able to share in the purchase and/or the viewing of the CoD with other users within the group.

The present invention relates to any form of digital CoD including, without limitation, movies and video (VoD), audio and electronic text. A group of users contemplates two or more individuals, entities, or electronic devices capable of receiving CoD such as computers, televisions, set top boxes, cable boxes, phones, portable media players, etc.

BRIEF DESCRIPTION OF THE DRAWINGS

Other objects, features and advantages of the invention will become more apparent after reading the following detailed description of preferred embodiments of the invention, given with reference to the accompanying drawings, in which:

FIG. 5 is an example SIP INVITE SDP containing a group ticket URI.

DETAILED DESCRIPTION OF PREFERRED EMBODIMENTS

Figure 1:
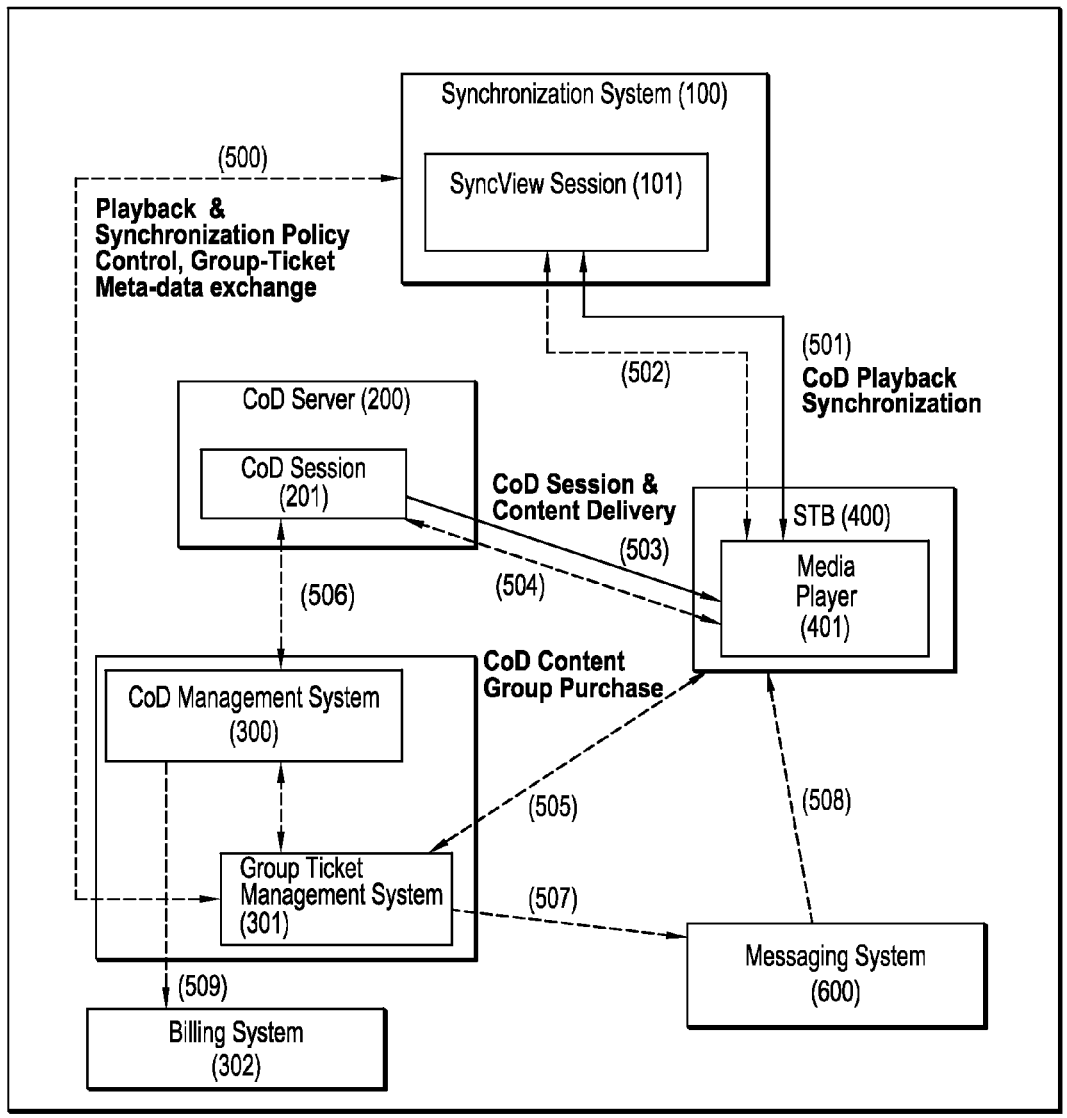
FIG. 1 is a schematic representation of a system used in providing CoD according to an embodiment of the invention.

In FIG. 1, a CoD Management System (300) comprises one or more computer processors or computer readable media having one or more executable computer programs stored thereon. A group ticket management system (301) is associated with, or part of, the CoD Management System (300).

CoD Management System (300) stores or accesses information sufficient to define a CoD offering. A CoD offering definition includes information sufficient to identify a given piece of CoD, e.g. by title, and may include additional information such as price, availability time frame or type of purchase (e.g. time restricted rental).

In accordance with the invention, a CoD offering definition includes a group purchase option. A group purchase option may include group-related restrictions or options such as a minimum number of users required to purchase the CoD offering and/or a discounted price.

A group purchase option may include a price per user discount function which is dependent upon the number of purchasing users. For example, a CoD offering definition may provide for a rental price of $3.00 for a single user or, under a group purchase option, $2.50 per user for a group of two users and $2.00 per user for a group of three users.

A group purchase option in a CoD offering definition also may define various group user access rights. For example, a given group purchase option may or may not restrict the viewing time frame or whether the purchased content may be viewed by members of the purchasing group independently or only concurrently by all members of the group. Preferably, the group purchase option defines which users, if any, within the group will be permitted access to trick play functionalities (e.g. pause, fast forward, rewind etc.) and whether trick play functionalities will be synchronized between some or all users within the group.

Once the CoD content offering is established, it is made available to end-users for consumption. Preferably the CoD management system (300) implements a CoD content library browser that allows end-users to browse, search for and purchase CoD content, including CoD content for which a group purchase option is provided. The CoD management system also may track information concerning each user's purchase or rental.

When a user (400) locates a CoD offering in the CoD library and is interested in purchasing/renting it for consumption, there may be different purchase/rental options, with one of them being the "group purchase" option.

By selecting the group purchase option the initiating user may select several additional users (e.g. friends or family members) to whom a "request for group purchase" invitation should be sent.

Consequently, the CoD group ticket management system (301) generates a group ticket which records an identification of the initiating user (400) as the initiator of the group purchase. The user (400) receives the group ticket in a system specific form, for instance as a uniform resource identifier (URI) link to the group ticket, or the group ticket definition data itself. If a URI link is used, the link to the group ticket is also used as the group ticket identifier in the system.

The group ticket management system (301) stores the group ticket along with the ticket status and the CoD offering details set forth in the CoD offering definition. The group ticket status indicates whether the ticket is "pending" or "completed." Other states such as "canceled," "updated" or "modified" may also be possible.

After a sufficient number of users execute a group purchase option for a given CoD, the CoD management system (300) and/or group ticket management system (301) transitions the group ticket status to "completed" and issues one or more charging records to a billing system (302). A completed group ticket comprises computer-readable information sufficient to identify the requested CoD, the group of users authorized to receive the requested CoD, and any applicable restrictions and/or options contained in the CoD offering definition. Users may be identified by way of an ISP address, account number or any other recordable information that is sufficient to identify a given individual or a given electronic device.

In a preferred embodiment, the group ticket management system (301) is operable to implement a group purchase negotiation phase in connection with a group purchase request. For example, a negotiation phase may be implemented in response to an initiating user's request for a group purchase of a given CoD offering. In that case, group ticket management system (301) may generate a "pending" group ticket comprising information regarding the CoD offering definition, the group purchase option criteria and the identity of the requesting user. The group ticket is assigned a pending status during a group purchase negotiation phase and until all the purchase criteria are met.

In order to assist users in the group purchase negotiation phase the CoD group ticket management system (301) may be operable to send an individual invitation message (e.g. instant message, SMS, email etc.) via a messaging system (600) to each user participating in the group purchase negotiation. Users participating in the group purchase negotiation may be selected by the requesting user, another participating user, the group ticket management system, or any other source or combination of sources. During the negotiation phase the list of participating users may change, e.g. by inviting another user or by a user rejecting the purchase invitation.

The above-mentioned individual messages preferably contain the informational status of the pending group ticket, e.g. the list of users currently participating, which user has accepted the group purchase CoD offering, which user has rejected the offering, the current price per user, further purchase criteria to be met etc. The messages also may contain the pending group ticket (e.g. a URI link) and possibly links to the CoD management system (300/301) graphic user interface (GUI) for interaction with the CoD management system, the group ticket management system and/or the pending group ticket. However, invitations containing the pending group ticket information may alternatively, or additionally, be communicated by one or more users in the participating group.

When participating users receive the group purchase invitation they can accept or reject the purchase invitation. In either case the group ticket management system (301) preferably receives information sufficient to indicate the acceptance or rejection of an invitation. The group ticket management system also may generate and send new or updated notification messages and/or invitations, similar to the previous invitation messages, to users currently participating in the negotiation process.

The price per user may be updated during a group purchase negotiation phase depending upon the number of users accepting to carry out the purchase. This can be defined by a price per user discount function as described above. Other parameters of the group purchase option may also be modified during the negotiation phase, either through generating a new pending group ticket or updating an existing pending group ticket.

For example, if a given set of group purchase criteria is not met, the group ticket management system may permit the participating users to select another option (e.g. different pricing) in order to proceed with the purchase. For instance, if a group purchase for 4 users was initiated, but only 3 users can agree on the purchase, those 3 users may be provided an option for a group purchase for 3 people at a different price. This can be realized by canceling the existing pending group ticket and generating a new pending group ticket for the offer for 3 people, or by modifying existing pending group ticket.

Figure 2:
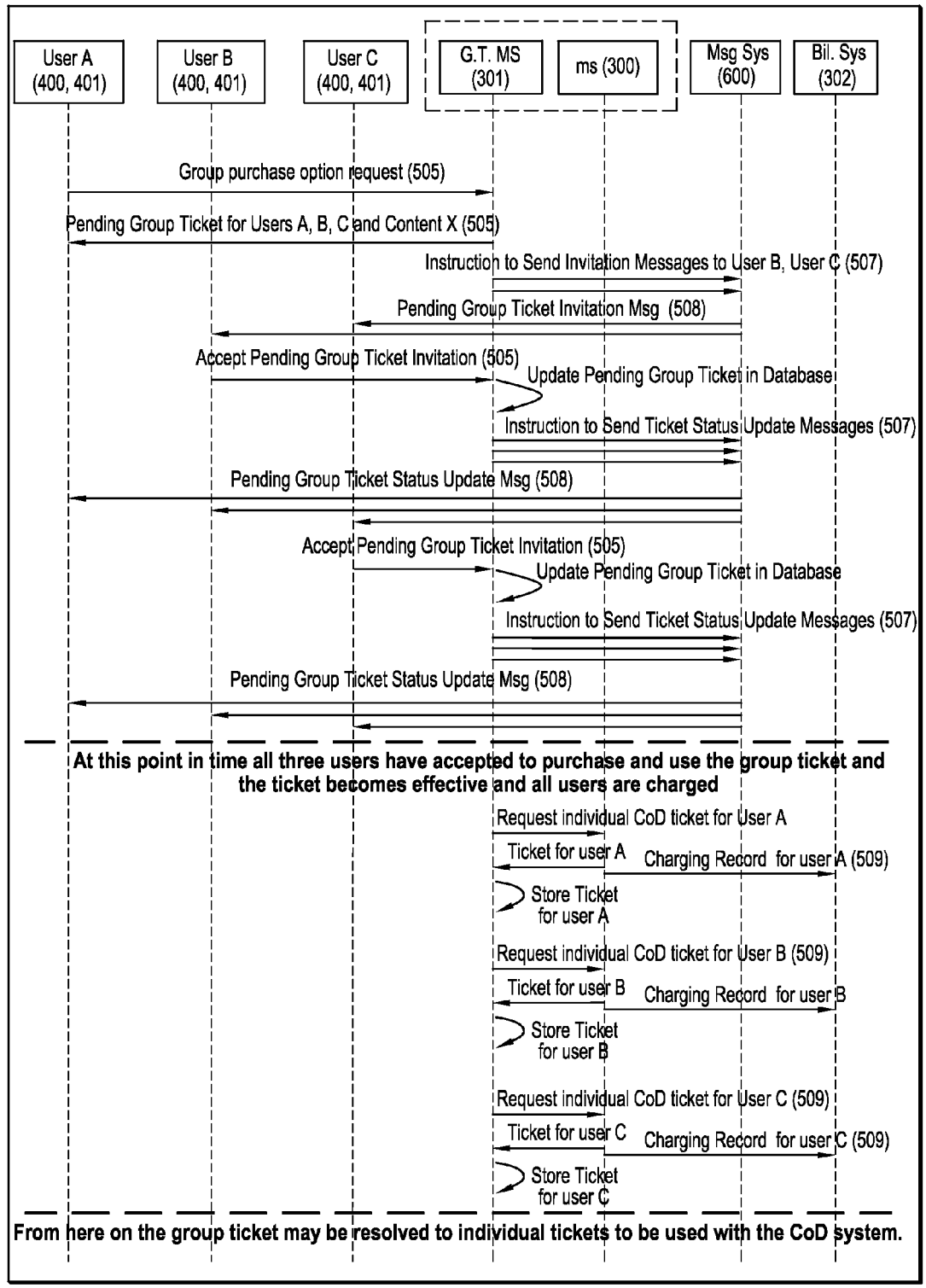
FIG. 2 is a flow chart outlining several steps of a method used in providing CoD according to an embodiment of the invention.

An example of one possible group purchase negotiation is depicted in FIG. 2. As shown in that example, group ticket management system (301) receives information that User A has requested a group purchase option for CoD X. In response, group ticket management system generates and issues to User A a pending group ticket. Group ticket management system also generates pending group ticket invitation messages and instructs message system (600) to send the invitation messages to Users B and C. Users B and C may represent friends or family members designated by User A as participants in the group purchase negotiation.

In this example, group ticket management system (301) receives information that indicates User B's acceptance of the group purchase invitation and consequently generates a pending group ticket status update message. Group ticket management system (301) also instructs message system (600) to issue a status update message to each of the users participating in the group purchase negotiation.

In this example, group ticket management system (301) also receives information that indicates User C's acceptance of the group purchase invitation and consequently generates another pending group ticket status update message and instructs message system (600) to issue that status update message to each of the participating users.

In response to an acceptance or rejection of a group purchase invitation, the group ticket management system optionally records an updated pending group ticket.

In this example, acceptance by each of the three designated users, A, B and C, satisfies the criteria of the requested group purchase option and, consequently, group ticket management transitions the group ticket status from "pending" to "completed." As shown in FIG. 2, group ticket management system and the CoD management system may operate together such that the group ticket is generated and stored with respect to each of the group purchasing users. Generally, the group ticket management system (301) may store and update group ticket status information, such as whether a given ticket is "pending," "completed" or "canceled." The CoD management system in the example of FIG. 2 optionally issues a set of separate charging records to billing system (302) such that each user within the purchasing group is charged individually. Any alternative billing mechanism, such as group billing, may also be used.

The group purchase negotiation phase can occur in real or non-real time.

Figure 3:
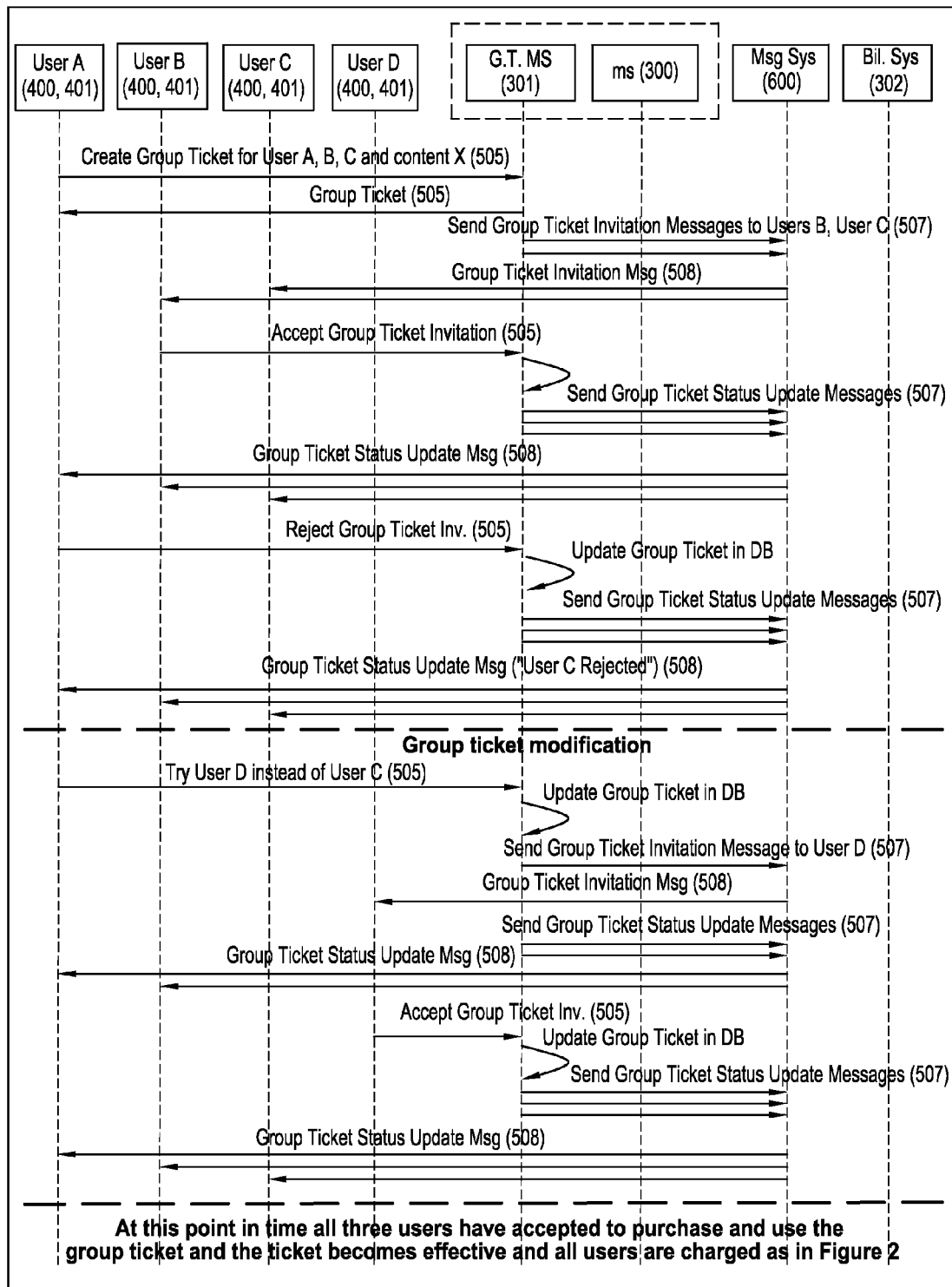
FIG. 3 is a flow chart outlining several steps of a method used in providing CoD according to another embodiment of the invention.

FIG. 3 depicts another possible group purchase negotiation sequence contemplated by the present invention. The scenario depicted in FIG. 3 differs from that of FIG. 2 in that it accommodates a rejection of the group ticket purchase invitation by one or more users participating in a negotiation.

In the example shown in FIG. 3, in response to receipt of information indicating User C's rejection of the group purchase invitation, the group ticket management system is instructed to include User D as a new participating user. The instruction to add User D to the participating group can originate from any of the existing participating users, such as the initiating user, or from another source. Accordingly, the group ticket management system generates and stores in the database an updated group ticket which identifies Users A, B and D as participating users. Alternatively, group ticket management system may change the status of the existing group ticket to "canceled" and generate a new group ticket corresponding to the newly defined group of participating users.

Once the updated (or new) group ticket is generated, the negotiation sequence proceeds as already described in connection with FIG. 2.

After one or more iterations in a negotiation, if a sufficient group of users have accepted an available set of group purchase criteria (e.g. validity time frame of the purchase, number of users, price per user, the users themselves etc.), then the group ticket management system will transition the group ticket into the "completed" state. As noted, the completed group ticket comprises computer-readable information sufficient to identify the requested CoD, the group of authorized users, and preferably any applicable restrictions and/or options contained in the group purchase CoD offering definition. The group ticket management system may subsequently obtain and preferably store individual CoD tickets for those users identified by the completed group ticket.

A group purchase may be completed after any number of iterations in a negotiation. Alternatively, a group purchase can be completed without a negotiation, such as in the event that all criteria of a given group purchase option of a CoD offering definition are satisfied in the first instance.

After a group purchase is completed, the CoD management system (300) may instruct a billing system (302) to issue one or more charging records based on the price per user of the group purchase. Preferably, each user of the purchasing group is charged individually.

The CoD group ticket may be added to each user's list of purchased/rented CoD content individually. Optionally, the CoD management system sends to each user of the group the same group ticket. Alternatively, group ticket management system (301) may resolve a group ticket into individual content tickets effective as to each respective member of the purchasing group.

The CoD management system (300) may generate an instruction to one or more CoD servers (200) so as to make the group-purchased CoD deliverable to each authorized user within the purchasing group, subject to any applicable restrictions and/or options associated with the group purchase CoD offering definition. In one form contemplated by the present invention, CoD management system may respond to a query received from a CoD server (200) concerning a given CoD session (201) setup request. For example, a CoD server (200) receiving a CoD session (201) setup request from a terminal (400/401) might query the CoD management system (300) whether the request is valid or not. Different users within a group may be served by different CoD servers.

Preferably, the group ticket can be used immediately or at a later point in time to initiate a CoD session (201) setup. In one embodiment, an authorized user initiates a request to the CoD Management System (300/301) using the obtained group ticket. The CoD Management System then assigns an appropriate CoD server for the requesting user and returns e.g. a real time streaming protocol (RTSP) URI for further session setup and control.

Depending upon the policies of the CoD group purchase offering, the CoD management system (300/301) may refuse the first step of the session setup. For instance, this may occur when fewer than all of the authorized users request a session setup and the group ticket requires that all the purchasing users must receive the CoD content at essentially the same time. In this case the media session synchronization server (100) and the content management system (300) can exchange information (500) regarding the group ticket.

Preferably, the synchronization system (100) queries (500) the CoD management system (300) for meta-data information about a given group ticket during the session setup and throughout the duration of a synchronized CoD viewing session (101). Alternatively, the CoD management system (300) communicates meta-data information about the group purchased CoD with synchronization system (100). Synchronization system (100), which may be server-based, thus may apply the various media consumption policies, if any, to a session within the purchasing group even if the users are served by different CoD servers.

Thus, for example, a purchasing group of users may be restricted, in accordance with the group purchase option of the purchased CoD offering, such that all users of the group must view the CoD essentially simultaneously. This may be accomplished through operation and communication of the synchronization system (100), CoD server (200) and CoD management server (300).

Synchronization system (100) also may operate to coordinate any trick play functionality (e.g. pause, fast forward, rewind etc.) between one or more users within the purchasing group, as provided for by the CoD definition in the CoD Management System (300). For example, trick play functionality may be provided as to one user, more than one user or all users within the group. Preferably, synchronization system (100) is operable to facilitate synchronized trick play functionality to one or more users within the group, such that implementing a trick play operation by one user performs the same trick play operation as to every other user within the group.

Figure 4:
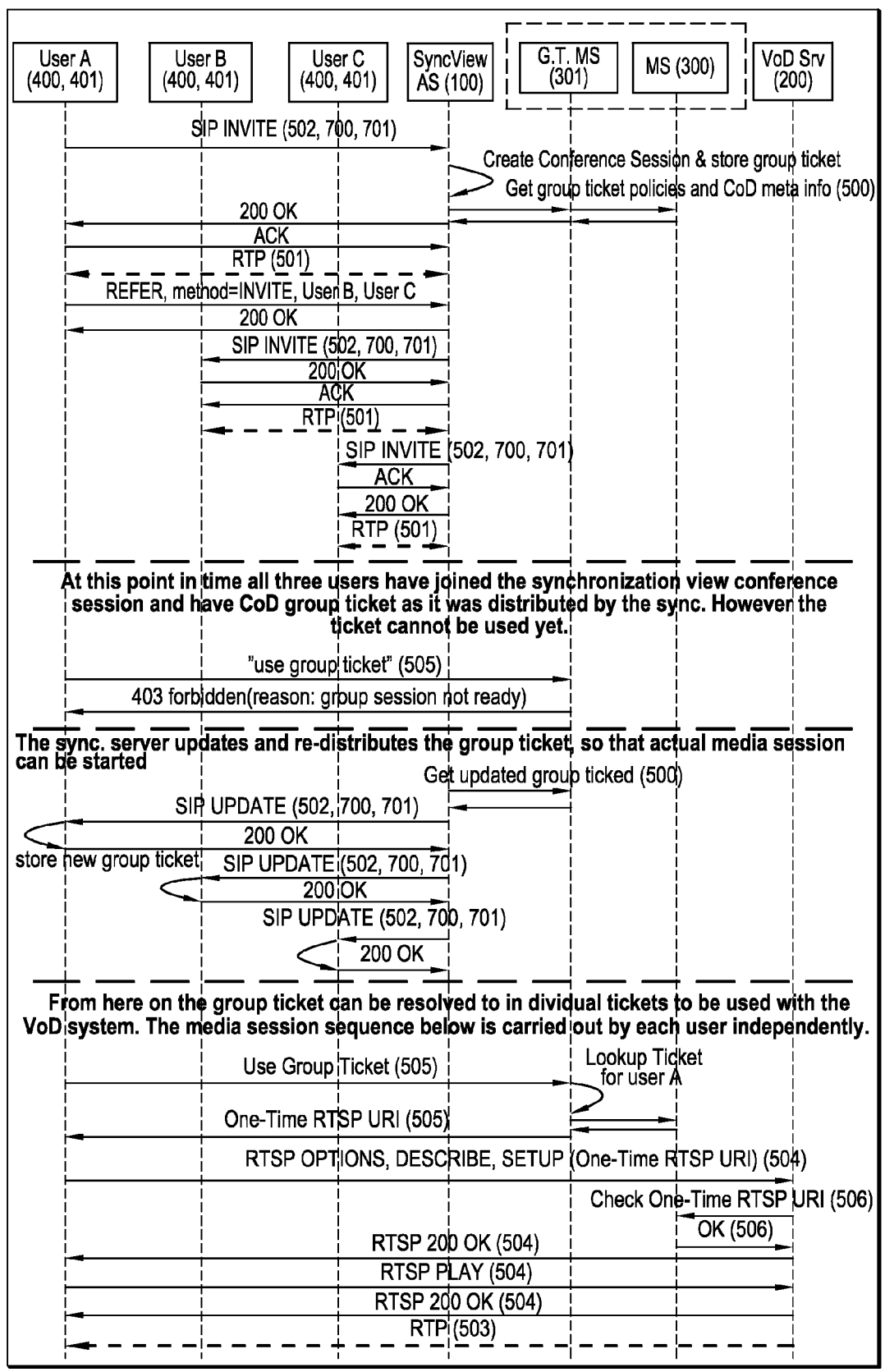
FIG. 4 is a flow chart outlining several steps of a method used in setup of a media playback session according to an embodiment of the invention.

One example of a media playback session setup in accordance with the invention is depicted in FIG. 4.

In that example, the content playback procedure is initiated by a user by browsing the list of available purchased/rented CoD content (which the CoD management system keeps track of), selecting a media title and starting playback. Technically, this step is independent of the CoD purchase step. However, in practice users may start watching a CoD immediately after buying or renting it.

If the CoD media title was purchased pursuant to a group purchase option, each user of that group will have been issued the same group ticket and will refer to that same group ticket when initiating CoD media playback.

Before starting CoD media playback the user end device (400) may query the CoD management system (300/301) for information on a content ticket. If the ticket is a group ticket, the CoD group ticket management system (301) can return information such as the list of users who purchased the ticket and any content consumption restrictions set forth in the group purchase option of the CoD offering definition.

If the content is to be watched as a group, the initiating user can create an ad-hoc conference session (101) on the synchronization server (100) using standard SIP/SDP conferencing mechanisms. This conference session (101) is then used for media and trick play synchronization, in addition to the actual media playback session (201) on the CoD server (200) that is serving a particular user.

When creating the ad-hoc conference session (101) the initiating user includes the CoD group ticket in the form of a URI (700) (e.g. in FIG. 5) in the SDP u-line of the initial SIP INVITE towards the synchronization server (100). An alternative transmission of the group ticket is also possible and is not restricted to the SDP u-line. The synchronization server (100) stores the group ticket URI in the session state (101) and can use it to query (500) additional information contained on the group ticket (e.g. playback restrictions etc) and optionally the CoD content itself (e.g. duration of the media content).

After establishing the ad-hoc conference session, the initiating user may instruct the synchronization server to invite other users into the session by using standard SIP/SDP conferencing mechanisms.

When the synchronization server sends a SIP INVITE to another user it includes the group ticket URI in the SDP u-line so that users who receive the SIP INVITE can use this ticket to query the CoD Management System (300/301) for information about the CoD content and display an appropriate session invitation dialog on the screen. After joining the media synchronization conference session, the group ticket is used to setup a media session (201) with the CoD server (200) by each user individually. In cases where a CoD server does not support session establishment with the group ticket directly, the group ticket may be converted into an RTSP one-time URI as shown in FIG. 4.

If a media consumption restriction is based on a minimum number of users watching the purchased CoD simultaneously, the CoD management system (300/301) will refuse the media session (201) setup for the group ticket as it is in order to prevent individual users from starting content consumption (playback) without meeting the criteria. To be able to start media playback in that condition, all the users of the group must join the synchronization conference session (101) on the synchronization server (100).

After all users of the group have joined the synchronization conference session (101), the synchronization server (100) may request a temporary ticket from the CoD management system (300) and distribute it to each user participating in the session, for example by doing a SIP session update (re-INVITE, UPDATE) and specifying the updated group ticket in the SDP u-line. The users that receive the updated group ticket then may use it to setup a media session (201) with the assigned CoD server (200).

During the synchronized CoD session the synchronization server and/or the CoD management system (300/301) can invalidate the currently used ticket and re-distribute a new group ticket at any point in time. This mechanism is used, for example, when a user leaves the synchronized viewing session and the media playback for the remaining users should be stopped.

During the synchronized CoD session the participants and the synchronization server exchange information over an RTP/I derived protocol in order to synchronize the media playback and implement floor control for trick play commands.

While the present invention has been described in connection with various preferred embodiments and specific examples thereof, it is to be understood that those embodiments and examples are provided merely to illustrate the invention, and should not be used as a pretext to limit the protection conferred by the true scope and spirit of the appended claims.

What is claimed is:

1. A method for providing digital content on demand (CoD), comprising:
   providing, from a CoD management computer processor, an immediately deliverable digital CoD offering including a single user purchase option and a group purchase option, wherein said group purchase option includes as a criterion a minimum plurality of user devices separately accepting said CoD offering;
   receiving, at the CoD management computer processor, information sufficient to indicate acceptance of said group purchase option of said CoD offering by each of said minimum plurality of user devices;
   generating, from a CoD group ticket management computer processor that is associated with or part of the CoD management computer processor, a group ticket, said group ticket comprising computer-readable information sufficient to identify said CoD offering and to identify each of said minimum plurality of user devices; and
   generating, from the CoD management computer processor, an instruction to permit said CoD to be immediately deliverable on demand from a CoD server to the single user under the single user purchase option, and to each of said minimum plurality of user devices under the group purchase option.

2. A method according to claim 1 wherein: said CoD comprises a movie, video, multi-media or mono-media content.

3. A method according to claim 1 comprising:
   instructing a billing system to charge each of said minimum plurality of users individually.

4. A method according to claim 1 comprising:
   conducting a negotiation, said negotiation comprising generating an invitation to accept said group purchase option of said CoD offering.

5. A method according to claim 4 wherein:
   said step of generating an invitation comprises providing access to a searchable database of digital content available on demand.

6. A method according to claim 4 wherein:
   said step of generating an invitation comprises identifying one or more users as participating users and generating an invitation to be issued to each of said participating users.

7. A method according to claim 6 wherein:
   said invitation includes information sufficient to identify one or more criteria associated with said group purchase option of said CoD offering, said criteria including price per user, said minimum plurality of users or remaining number of acceptances required.

8. A method according to claim 7 wherein:
   said negotiation further comprises generating a subsequent invitation, said subsequent invitation including information sufficient to identify one or more modified criteria associated with said group purchase option of said CoD offering.

9. A method according to claim 8 wherein:
   said modified criteria include a different price per user or a different minimum plurality.

10. A method according to claim 1 comprising:
    generating an instruction to a synchronization system to permit said CoD to be deliverable to each of said minimum plurality of users essentially simultaneously.

11. A method according to claim 1 comprising:
    generating an instruction to a synchronization system to permit said CoD to be deliverable to at least one of said minimum plurality of users in a manner that permits trick play.

12. A method according to claim 11 comprising:
    generating an instruction to a synchronization system to permit said CoD to be deliverable to at least one of said minimum plurality of users in a manner that permits synchronized trick play.

13. A system comprising:
    one or more computer processors operable to:
    store or access an immediately deliverable digital CoD offering including a single user purchase option and a group purchase option, wherein said group purchase option includes as a criterion a minimum plurality of users separately accepting said CoD offering;
    receive information sufficient to indicate acceptance of said group purchase option of said CoD offering by each of said minimum plurality of users;

generate a group ticket, said group ticket comprising computer-readable information sufficient to identify said CoD offering and to identify each of said minimum plurality of users; and generate an instruction to permit said CoD to be immediately deliverable on demand to the single user under the single user purchase option and to each of said minimum plurality of users under the group purchase option.

14. A system according to claim 13 wherein:
said CoD comprises a movie, video, multi-media or mono-media content.

15. A system according to claim 13 wherein:
said one or more computer processors are operable to instruct a billing system to charge each of said minimum plurality of users individually.

16. A system according to claim 13 wherein:
said one or more computer processors are operable to conduct a negotiation, said negotiation comprising generating an invitation to accept said group purchase option of said CoD offering.

17. A system according to claim 16 wherein:
said operability to generate an invitation comprises providing access to a searchable database of digital content available on demand.

18. A system according to claim 16 wherein:
said operability to generate an invitation comprises identifying one or more users as participating users and generating an invitation to be issued to each of said participating users.

19. A system according to claim 18 wherein:
said invitation includes information sufficient to identify one or more criteria associated with said group purchase option of said CoD offering, said criteria including price per user, said minimum plurality of users or remaining number of acceptances required.

20. A method according to claim 19 wherein:
said negotiation further comprises generating a subsequent invitation, said subsequent invitation including information sufficient to identify one or more modified criteria associated with said group purchase option of said CoD offering.

21. A system according to claim 20 wherein:
said modified criteria include a different price per user or a different minimum plurality.

22. A system according to claim 13 wherein:
said one or more computer processors are operable to generate an instruction to a synchronization system to permit said CoD to be deliverable to each of said minimum plurality of users essentially simultaneously.

23. A system according to claim 13 wherein:
said one or more computer processors are operable to generate an instruction to a synchronization system to permit said CoD to be deliverable to at least one of said minimum plurality of users in a manner that permits trick play.

24. A system according to claim 23 wherein:
said one or more computer processors are operable to generate an instruction to a synchronization system to permit said CoD to be deliverable to at least one of said minimum plurality of users in a manner that permits synchronized trick play.

25. A non-transient computer readable medium having a computer program stored thereon which, when executed by a computer processor, performs a method comprising:
providing an immediately deliverable digital CoD offering including a single user purchase option and a group purchase option, wherein said group purchase option includes as a criterion a minimum plurality of users separately accepting said CoD offering;

receiving information sufficient to indicate acceptance of said group purchase option of said CoD offering by each of said minimum plurality of users;

generating a group ticket, said group ticket comprising computer-readable information sufficient to identify said CoD offering and to identify each of said minimum plurality of users; and generating an instruction to permit said CoD to be immediately deliverable on demand to the single user under the single user purchase option and to each of said minimum plurality of users under the group purchase option.

26. The non-transient computer readable medium according to claim 25 wherein:
said CoD comprises a movie, video, multi-media or mono-media content.

27. The non-transient computer readable medium according to claim 25 which, when executed by a computer processor, performs the step of instructing a billing system to charge each of said minimum plurality of users individually.

28. The non-transient computer readable medium according to claim 25 which, when executed by a computer processor, performs the step of conducting a negotiation, said negotiation comprising generating an invitation to accept said group purchase option of said CoD offering.

29. The non-transient computer readable medium according to claim 28 wherein:
said step of generating an invitation comprises providing access to a searchable database of digital content available on demand.

30. The non-transient computer readable medium according to claim 28 wherein:
said step of generating an invitation comprises identifying one or more users as participating users and generating an invitation to be issued to each of said participating users.

31. The non-transient computer readable medium according to claim 30 wherein:
said invitation includes information sufficient to identify one or more criteria associated with said group purchase option of said CoD offering, said criteria including price per user, said minimum plurality of users or remaining number of acceptances required.

32. The non-transient computer readable medium according to claim 31 wherein:
said negotiation further comprises generating a subsequent invitation, said subsequent invitation including information sufficient to identify one or more modified criteria associated with said group purchase option of said CoD offering.

33. The non-transient computer readable medium according to claim 32 wherein:
said modified criteria include a different price per user or a different minimum plurality.

34. The non-transient computer readable medium according to claim 25 which, when executed by a computer processor, performs the step of generating an instruction to a synchronization system to permit said CoD to be deliverable to each of said minimum plurality of users essentially simultaneously.

35. The non-transient computer readable medium according to claim 25 which, when executed by a computer processor, performs the step of generating an instruction to a synchronization system to permit said CoD to be deliverable to at least one of said minimum plurality of users in a manner that permits trick play.

36. The non-transient computer readable medium according to claim 35 which, when executed by a computer processor, performs the step of generating an instruction to a synchronization system to permit said CoD to be deliverable to at least one of said minimum plurality of users in a manner that permits synchronized trick play.

* * * * *